(No Model.)
C. CRANDALL.
AXLE LUBRICATOR.
No. 345,213. Patented July 6, 1886.
Fig. 1.
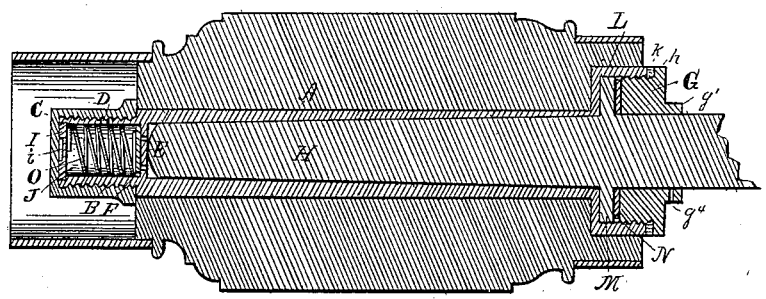
Fig. 2.      Fig. 3.
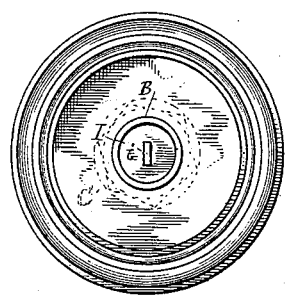 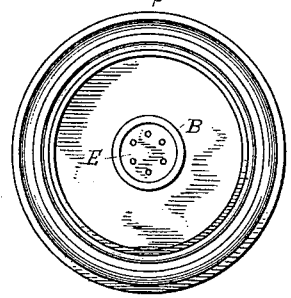
Fig. 4.      Fig. 6.
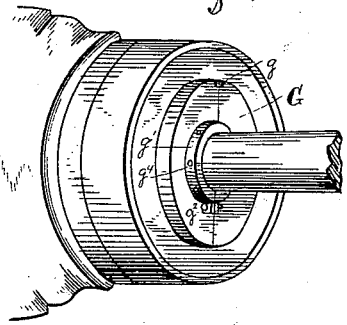 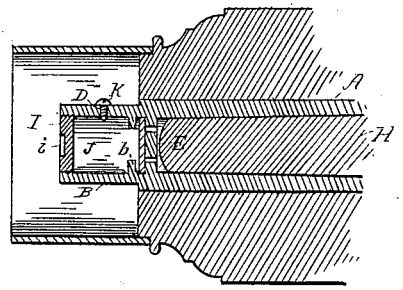
Fig. 5.      Fig. 7.
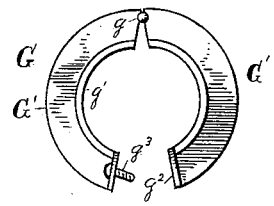 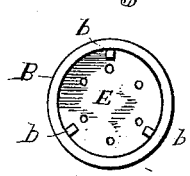
WITNESSES.
J. Thomson Cross
E. M. Chancey
Charles Crandall
INVENTOR.
By M. D. Peck
Attorney.

UNITED STATES PATENT OFFICE.

CHARLES CRANDALL, OF NEWPORT, RHODE ISLAND.

AXLE-LUBRICATOR.

SPECIFICATION forming part of Letters Patent No. 345,213, dated July 6, 1886.

Application filed May 19, 1886. Serial No. 202,661. (No model.)

*To all whom it may concern:*

Be it known that I, CHARLES CRANDALL, a citizen of the United States, residing at Newport, in the county of Newport and State of Rhode Island, have invented certain new and useful Improvements in Oil-Cups for Axles; and I do hereby declare the following to be a full, clear, and exact description of the invention, such as will enable others skilled in the art to which it appertains to make and use the same, reference being had to the accompanying drawings, which form part of this specification.

My invention relates to a new and useful improvement in axles for wheel-vehicles, and has for its object to secure the wheel to the axle in such a manner as to avoid the necessity of its removal in oiling the axle, and in forming an oil-chamber within the box of the hub, so as to enable the axle-spindle and box to be lubricated by the oil being readily drawn the length of the box in such quantities as shall be required for a considerable period of time without replenishing the oil-chamber; and it consists in a certain peculiarity of construction hereinafter described, and more particularly pointed out in the claims.

Heretofore great difficulty has been experienced in keeping the axle-spindle in a moderate state of lubrication for any considerable length of time, owing to the tendency of the oil to escape by the side of the nut or packings of the wheel as soon as it becomes heated when the vehicle is in motion, and the consequent dryness of the spindle and wear and injury to the same before it is discovered that additional oil is required.

In the drawings, Figure 1 represents a sectional view of my invention in the hub of a wheel. Fig. 2 represents an outer end view of the hub of the wheel, with the screw-cap shown in dotted lines removed from the extended end of the wheel-box. Fig. 3 is a view of the outer end of the hub of the wheel, with the screw-cap, screw-stopper, and disk removed, exposing to view the perforated partition on the inner end of the oil-chamber. Fig. 4 is a perspective view of the inner end of the hub of the wheel, showing the axle-nut screwed into wheel-box holding the wheel on the axle-spindle. Fig. 5 is a view of the hinged nut removed from the axle, illustrating its means of application. Fig. 6 is a modified form of the oil-chamber on the extended end of the wheel-box, and Fig. 7 is an end view of the same.

Similar letters of reference indicate corresponding parts in the several figures.

A represents a wheel-box in the hub of a wheel with its outer end, B, extended beyond the hub proper, and reduced in diameter to form an oil-chamber, J, entirely within the extended portion, with an external screw-thread on the reduced portion for the reception of a screw-cap, and an internal screw-thread at or near the outer end of the chamber for a screw-stopper.

At a point in the wheel-box A adjacent to the extended reduced portion B is a perforated partition, E, which may be made integral with the box, or be of a separate piece and secured therein. On the outer side of the perforated partition, and within the oil-chamber J, a disk, F, of felt or other porous material, is placed against the partition to enable the oil to gradually ooze or percolate through from the oil-chamber J into the wheel-box, and thus surround and gradually extend its entire length to lubricate the axle-spindle H. A screw-stopper, I, is filled into the outer end of the oil-chamber, forming a tight joint to retain the oil within the chamber when desired, and is so constructed as to be unscrewed by means of a screw-driver or other suitable tool inserted in its outer recess, $i$, when it is desired to remove the sediment from and clean the oil-chamber. A coiled or spiral wire spring, O, is placed within the oil-chamber, so that the screw-stopper shall form a bearing for one of its ends, while the other rests against and holds the felt disk F in position over the perforated partition E against the jarring tendency to displace it when the vehicle is in motion. The vibrations of the coil also tend to keep the oil in motion when thickened or cold and to keep up a free circulation. This spring may be made slightly less in diameter than the chamber and rest loosely therein, or be secured to the screw-stopper and withdrawn therewith in cleansing the chamber. Suitable lugs, b, may be formed in the chamber, for retaining the disk F in place, in lieu of the coiled spring, if desired. In the upper side of the oil-chamber a small screw-hole, D, is inserted through the external screw-threads on the reduced portion of the box into the chamber, through which the oil is poured in filling the chamber. A screw-cap, C, is made to fit over the entire extended reduced portion B, constituting the oil-chamber, and in adjusting the screw-cap to its seat the filling-hole D is securely closed, preventing the escape of oil from the chamber, and dust or other foreign substances from getting into the oil-chamber, and thereby supplying a gritty substance in the oil that soon has a tendency to injure the wheel-box and axle-spindle by wearing, so that they become loose, and it is found necessary to replace them by new ones.

While I prefer the screw-cap C, so as to cover the entire oil-chamber and filling-hole, and prevent the accidental working out of the screw-stopper I, this form of covering may be dispensed with by removing the screw-cap and inserting a screw, K, in the screw-hole D, which will serve to prevent the outward escape of oil from the chamber.

When it is desired to use the screw in place of the cap, the external screw-threads may be omitted from the oil-chamber, as clearly shown in the modified form represented in Fig. 6.

With an oil-chamber constructed as above described, adapted at all times to supply the wheel-box and axle-spindle with the necessary amount of lubricating substance, it is found more desirable to provide means on the inner end of the axle-spindle for securing the wheel to the axle, and for this purpose the enlarged portion L of the wheel-box on the inner end of the wheel is made to project over the flange M of the axle-spindle and outside of the hub to an extent sufficient for the reception of a suitable packing or washer and nut on its inner surface. The inner surface of the enlarged projecting portion of the wheel-box is screw-threaded, and after the wheel is placed on the spindle a suitable packing or washer, N, is placed against the outer side of the flange M of the spindle within the enlarged portion of the wheel-box.

I construct the nut G in two parts, G' G', hinged together at g upon one side, so that when the parts are placed together they will form a ring. On the outer margin of the nut a flange, g', is formed on each part, which is made to project toward the periphery of the nut at $g^2$ at the opposite side from the hinge to form bearings for a screw, $g^3$, for securing the two parts rigidly together. The periphery of this nut is screw-threaded on its inner end portion, and on the outer end there is a flange, h, to receive and hold a packing, k, which is placed on the screw-threaded portion of the nut and crowded up against the flange to form a packing between the outer end of the enlarged part of the box and the flange on the periphery of the nut. When the nut is placed over the axle and its two parts secured together by the screw $g^3$, it is held securely by means of a tongs or other suitable tool applied to or in the holes $g^4$ of the flange g', while the wheel is turned until the nut and wheel are tightly screwed together, and both revolve upon the axle over the bearing-flange M of the spindle that holds the wheel on the axle. By this construction the removal of the wheel from the axle is avoided in oiling the axle-spindle, as it is only necessary to unscrew the cap from off the oil-chamber or remove the screw from the filling-hole to enable the oil-chamber to be refilled from time to time.

Having thus described my invention, what I claim as new, and desire to secure by Letters Patent of the United States, is—

1. A vehicle-wheel secured to the axle at the inner end of the hub, and having its box extended beyond the hub at the outer end, forming an oil-chamber within the extended portion, having a screw-stopper in its outer end, said chamber being adapted to be filled from the upper side without removal of the wheel from the axle-spindle, as set forth.

2. A wheel-box for vehicles extended beyond the outer end of the hub, forming an oil-chamber within the extended portion and reduced in diameter, having a screw-cap thereon and a screw-stopper within its outer end, said cap closing a filling-orifice in the upper side of the box and holding the screw-stopper in its seat in the end of the oil-chamber, substantially as and for the purpose set forth.

3. An oil-chamber for axles, formed within the part of the wheel-box extended beyond the hub, and having a perforated partition near the inner end of the chamber, said extended part of the box being reduced in diameter and having a screw-cap to cover its end and to close a filling-orifice in its upper side, as set forth.

4. An oil-chamber for axles, formed within the part of the wheel-box extended beyond the hub, having a screw-stopper in its outer end, and a perforated partition near its inner end covered by a disk of porous material, and means for holding the disk against the partition, substantially as set forth.

5. In combination with an oil-chamber for axles, formed within the part of the wheel-box extended beyond the hub, having a perforated partition at its inner end, covered by a disk of porous material, and a screw-stopper within its outer end, of a coiled or spiral spring in the chamber with its ends resting against the stopper and disk, substantially as set forth.

6. In combination with a vehicle-wheel secured to an axle at the inner end of the hub by a flanged screw-nut in two parts, hinged together, and having means on its flange for applying a holding-tool, said nut being screw-threaded on its periphery and adapted to be applied around the axle after the wheel is placed thereon, and to work into the enlarged part of the box of the wheel, of the wheel-box extended beyond the outer end of the hub to form an oil-chamber within the extended portion adapted to be filled without removal of the wheel from the axle, as set forth.

In testimony whereof I affix my signature in presence of two witnesses.

CHARLES CRANDALL.

Witnesses:
   THOMAS HENRY ALLEN,
   ADOLPHUS A. CHAPPELL.